United States Patent [19]

Renshaw

[11] Patent Number: 4,524,898
[45] Date of Patent: Jun. 25, 1985

[54] APPARATUS FOR PREVENTING STEP-EDGE SHEARING DURING ULTRASONIC WELDING

[75] Inventor: Theodore A. Renshaw, North Babylon, N.Y.

[73] Assignee: Fairchild Industries, Inc., Chantilly, Va.

[21] Appl. No.: 484,189

[22] Filed: Apr. 12, 1983

[51] Int. Cl.³ .............................................. B23K 20/10
[52] U.S. Cl. ..................................... 228/1.1; 156/73.1
[58] Field of Search .............. 228/1 R, 1 B; 156/73.1, 156/73.2, 73.3, 73.4

[56] References Cited

U.S. PATENT DOCUMENTS

| | | | |
|---|---|---|---|
| 3,586,122 | 6/1971 | Jacke | 228/1 R X |
| 4,249,986 | 2/1981 | Obeda | 228/1 B X |
| 4,406,720 | 9/1983 | Wang et al. | 156/73.2 X |

Primary Examiner—Kenneth J. Ramsey
Attorney, Agent, or Firm—Michael W. York

[57] ABSTRACT

Ultrasonic vibratory spot welding apparatus is provided, said apparatus being of the type including a welding tip adapted to introduce into and through at least two workpieces high frequency vibratory energy so as to effect a spot weld therebetween. A complimentary anvil is also provided and so positioned relative to said welding tip so as to define a throat therebetween between which the workpieces are adapted to be inserted for spot welding. Means are provided about either or both the welding tip and the anvil for preventing step shearing during the welding operation, said means comprising a shield positioned about the welding tip and/or the anvil. The shield preferably includes an inner and an outer layer, said inner layer being fabricated from either an organic material or a plurality of metallic materials. The outer layer, which is fixedly attached to either the welding tip and/or the anvil, is fabricated from a metallic material which has modulus lower than the modulus of steel. In actual operation, the shield serves to provided coaxial pressure to the workpieces during the welding operation thereby preventing step shearing at the point of weld.

6 Claims, 7 Drawing Figures

APPARATUS FOR PREVENTING STEP-EDGE SHEARING DURING ULTRASONIC WELDING

BACKGROUND OF THE INVENTION

The present invention relates generally to ultrasonic vibratory welding and, more particularly, to apparatus for preventing step-edge shearing during such welding operations. Step-edge shearing is a surface quality problem which, heretofore, had been a serious problem in such operations.

Ultrasonic vibratory spot welding processes for joining together two or more similar or dissimilar materials have been used for a number of years. Until recently, however, such methods were limited to use on thermoplastics, non-woven fabrics and metals where weld strength and integrity were not particularly important. This limitation was due, in large measure, to the problems associated with the ultrasonic welding methods employed, most of which were in prototype stages. In those instances when weld strength and weld integrity were important, i.e., when joining together structural aircraft panels and the like, resistance spot welding techniques were used.

Ultrasonic spot welding procedures have recently demonstrated strong potential for improved sheet metal asembly at reduced cost when compared with resistance spot welding and adhesive bonding techniques. Early studies have indicated that weld effected using prototype ultrasonic welding equipment such as, for example, a Sonobond M-8000 ultrasonic spot welder, were superior to welds produced using conventional resistance spot welding procedures. These early trials indicated that for virtually any material combination, an ultrasonically produced spot weld has an ultimate yield strength of more than 2.5 times that of a weld produced using resistance spot welding equipment. Further tests have indicated that ultrasonically produced spot welding can be accomplished with a 75% time and cost savings over conventional adhesive bonding techniques. Until now, however, ultrasonic spot welding for large structural metal parts was not possible in a production environment because of the numerous problems associated with the procedures.

Ultrasonic vibratory welding is a metallurgical joining technique which utilizes high frequency vibrations to disrupt the surface films and oxides and which, therefore, promotes interatomic diffusion and plastic flow between the surfaces in contact without any melting of the materials. Briefly stated, the ultrasonic welding process consists of clamping or otherwise securing together the workpieces under moderate pressure between the welding tip and a support anvil and then introducing high frequency vibratory energy into the pieces for a relatively short period of time, i.e., from a fraction of a second to a number of seconds. In many instances, the pieces to be welded are also adhesively bonded together by the insertion of an adhesive bonding agent between the juxtaposed pieces before welding which results in a high strength joint with superior static and fatigue properties.

One example of an ultrasonic spot welder particularly adapted for use on structural metal workpieces is the Sonobond Model M-8000 ultrasonic spot welder marketed by Sonobond Corporation of West Chester, PA. This welder includes a transistorized, solid state frequency converter which raises standard 60 Hz electrical line frequency to 15–40 kHz and then amplifies the output. The high frequency electrical power travels through a lightweight cable to a transducer in the welding head where it is converted to vibratory power at the same frequency. The vibratory power is, thereupon, transmitted through an acoustic coupling system to the welding tip and then through the tip into and through the workpieces, with the vibratory energy effecting the weld.

The Sonobond M-8000 ultrasonic spot welder includes a wedge-reed transducer coupling system which transmits lateral vibrations of a perpendicular reed member attached to it so that the welding tip at the lower end of the reed executes shear vibrations on the surface of the workpieces. The transducer includes piezoelectric ceramic elements encased in a tension shell assembly and operates at a nominal frequency of 15 kHz. A solid state frequency converter with a transistorized hybrid junction amplifier powers the welder. The converter operates at a nominal frequency of 15 kHz with a power output variable up to about 4000 RMS RF watts. The welder may be tuned to a precise operating frequency. The frequency converter includes a wide-band RF power measuring circuit which samples output power and detects forward power and load power based on the principle of bi-directional coupling in a transmission line. The signal is processed electronically to provide true RMS values which are selectively displayed on an LED panel meter as either the forward or load power. Forward power is the output of the frequency converter delivered to the transducer in the welding head while load power is the transducer drive power acoustically absorbed by the anvil. The difference between the two readings is the reflected power induced by the load impedance mismatch and is minimized during the welding operation by impedance matching techniques.

Step-edge shearing is a surface quality problem which has, oftentimes, been experienced during ultrasonic welding. The use of adhesive interlayers between the workpieces to be welded tends to cause a step-type indentation around the edge of the welding tips and/or the anvils of the ultrasonic welding apparatus which typically are dimensioned such that the edges of the anvils and/or the welding tips dig or otherwise cut into the sheets being welded together. In many ultrasonic welding applications, the workpieces to be joined are not only welded but are also adhesively bonded together by the insertion of a film adhesive between the workpieces prior to welding. Step-type indentations become a particularly serious problem when the workpieces to be welded together are relatively thin because it has been found that thin sheets are particularly subject to shear deformation due to the resistance of the film adhesive to flow and, further, due to the shear deformation enhancement of the ultrasonic energy being applied.

It will, of course, be appreciated that this step-edge effect is highly undesirable from both a quality and stress concentration point of view. In an effort to overcome the problem, larger diametered anvils having relatively shallow curvatures were investigated. While, in theory, apparatus using such anvils have reduced sharp step-edges, they were generally unacceptable since they prevent close juxtaposition of the spots to other structures that may be on the assembly.

Against the foregoing background, it is a primary object of the present invention to provide apparatus for overcoming the sharp step-type indentations encountered during ultrasonic welding.

It is another object of the present invention to provide such apparatus which does not unduly limit the applicablity of the ultrasonic welding operation.

It is yet another object of the present invention to provide such apparatus wherein a shield is provided about the welding tip and/or the anvil which is effectively isolated from the mechanical energy which passes through the welding tip and/or the anvil.

It is still another object of the present invention to provide such apparatus wherein the shield is used to apply pressure to the workpieces about the edges of the welding tip and/or the anvil.

SUMMARY OF THE INVENTION

The present invention, in brief summary, comprises ultrasonic vibratory spot welding apparatus of the type including a welding tip adapted to introduce into and through at least two workpieces high frequency vibratory energy so as to effect a spot weld therebetween. A complimentary anvil is also provided and so positioned relative to said welding tip so as to define a throat therebetween between which the workpieces are adapted to be inserted for spot welding. Means are provided about either or both the welding tip and the anvil for preventing step shearing during the welding operation, said means comprising a shield positioned about the welding tip and/or the anvil. The shield preferably includes an inner and an outer layer, said inner layer being fabricated from either an organic material or a plurality of metallic materials. The outer layer, which is fixedly attached to either the welding tip and/or the anvil, is fabricated from a metallic material which has modulus lower than the modulus of steel. In actual operation, the shield serves to provided coaxial pressure to the workpieces during the welding operation thereby preventing step shearing at the point of weld.

DETAILED DESCRIPTION OF THE INVENTION

Figure 1:
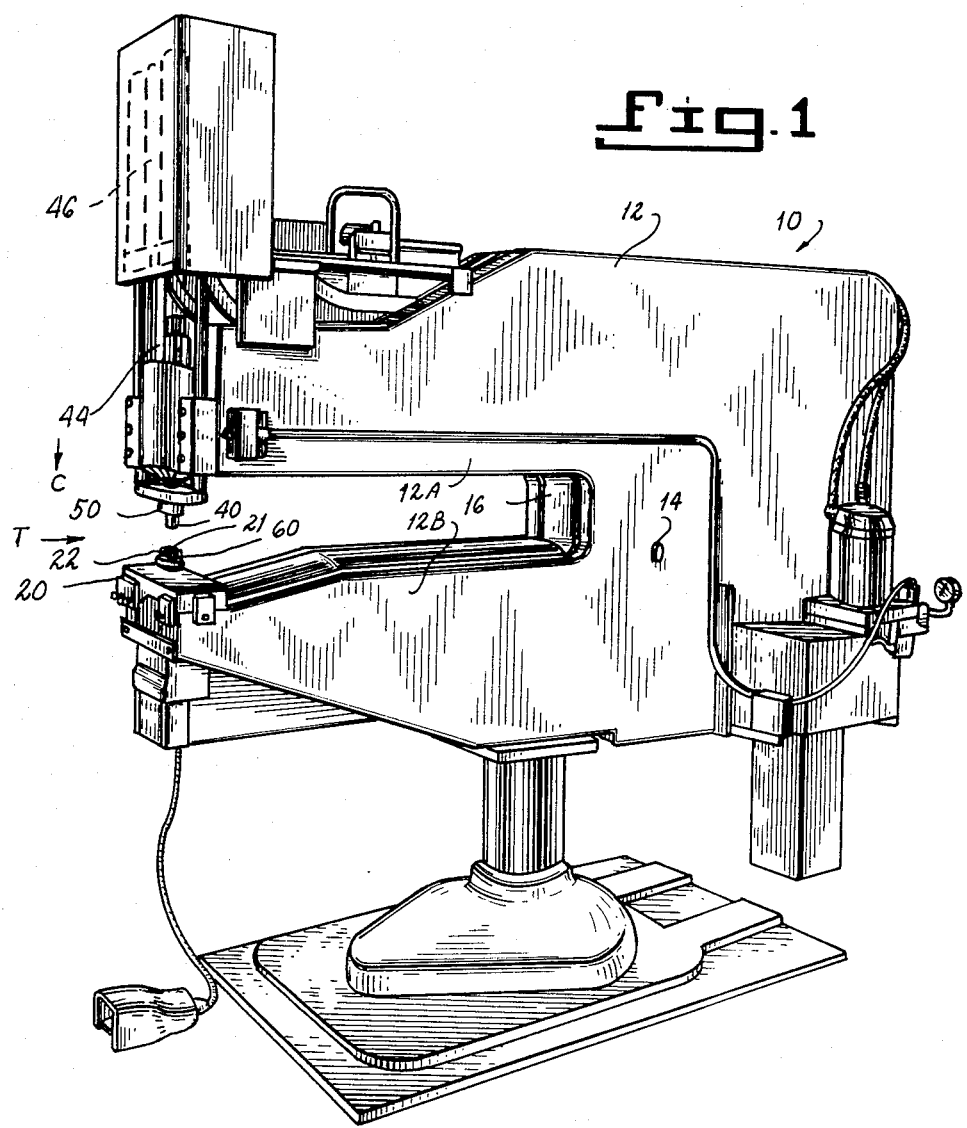
FIG. 1 is a general side perspective view of the ultrasonic welding apparatus used in accordance with the teachings of the subject invention.

An ultrasonic spot welding maching capable of welding together structural metal sheets, referred to generally by reference numeral 10, is illustrated in side perspective view in FIG. 1. Ultrasonic spot welder 10 includes a generally C-shaped clamping frame 12 pivotably mounted about pivot 14 and supported on a stationary central welder frame 16. Clamping frame 12 includes elongated upper and lower sections 12A and 12B, respectively, which, in combination with the central welder frame 16, define a throat T into which the workpieces to be welded may be inserted for welding.

A welding head 20, including a welding tip 21, which forms the end of a vibratory reed 22, is provided and is secured to stationary welder frame 16. A slideably mounted anvil 40 is provided on the opposite side of the throat. Collar clamps 50 and 60 are provided about the anvil 40 and the welding tip 21, respectively. Anvil 40, which is movable toward and away from welding tip 21 along anvil guides 44, is powered by at least one internally contained, hydraulic anvil cylinder 46. Anvil 40 moves independently from the movement of clamp 50. When a workpiece W to be welded (not shown in FIG. 1) is inserted into the throat T between the anvil 40 amd the welding tip 21, the anvil 40 is lowered in a clamping direction C toward welding tip 21 until the workpieces are clamped together between the clamps 50 and 60. This clamping action between the clamps 50 and 60 not only serves to clamp the workpieces together but, additionally, causes a compressive force to be applied between them. Spot welding of the workpiece may therefore be accomplished in the manner hereinafter described.

Vibratory reed 22, at its end opposite the welding tip 21, is connected to a transducer (not shown) which is contained within welding frame 16. The transducer transmits lateral vibrations and induces flexural vibration of the reed 22 so that the welding tip 21 at the upper end of the reed 22 may introduce shear vibrations into the workpieces. The transducer consists of piezoelectric ceramic elements encased in a tension shell assembly and is operated at a nominal frequency of about 15 kHz.

Spot welder 10, which is a modification of the Sonobond Model M-8000 ultrasonic spot welder, includes a frequency converter which incorporates a wide-band RF power measuring circuit for sampling the output power to detect the forward power and the load power based on the principle of bi-directional coupling in a transmission line. The signal is processed electronically by internal circuitry to provide true RMF values which are displayed as either the forward power or the load power. Forward power is the output of the frequency converter delivered to the transducer in the welding tip 21 while load power is the transducer drive power that is acoustically absorbed in the weld zone. The difference between the forward power and the load power represnts the reflected power induced by the load impedance mismatch and is minimized during subsequent welding operations by impedance matching techniques.

Welding tip 21 and anvil 40 are both fabricated from a generally hard metal such as, for example, steel hardened to about Rc 50. The radii of the welding tip 21 may be between about 2" and about 20" and the shape and dimension of anvil 40 generally conforms to that of the welding tip 21.

Figure 2:
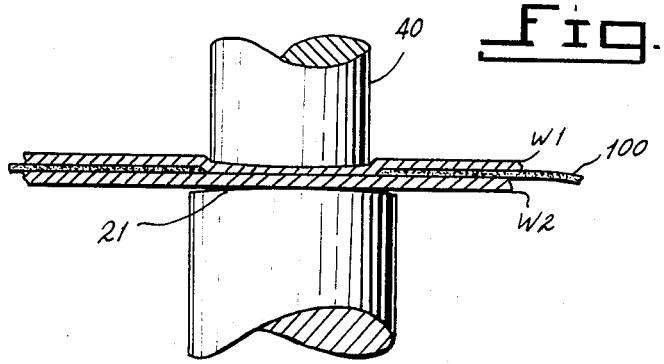
FIG. 2 is a sectional view illustrating the step-edge shearing problem heretofore experienced with prototype ultrasonic welding apparatus.

FIG. 2 illustrates the step-edge shearing problem experienced using prototype ultrasonic welding apparatus, particularly when ultrasonically welding together relatively thin workpieces when a film of adhesive material has first been inserted between the workpieces. As can be seen in FIG. 2, when the anvil 40 and welding tip 21 are brought together against workpieces W1 and W2 the reduced diameter of anvil 40 and the sharp edges thereof causes a sharp step edge indentation to be formed in upper workpiece W1. Thin workpieces are particularly subject to shear deformation due to the resistance to flow of the film adhesive 100 and further due to the shear deformation enhancement of the ultrasonic energy introduced into the workpieces from the welding tip 21. Step shear indentations tend to cause quality problems in the resultant welded workpiece since they have a poor appearance and further because they act as stress concentrators.

Figure 3:
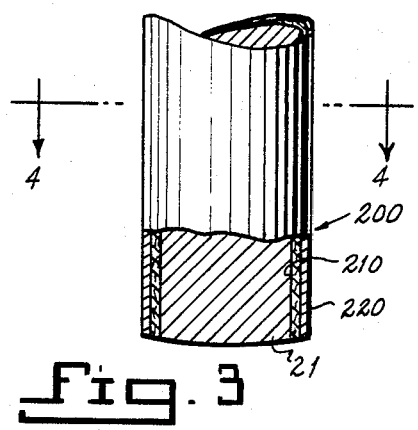
FIG. 3 is an enlarged sectional view of the anvil of such ultrasonic welding apparatus which includes a shielding layer around the periphery thereof.
Figure 4:
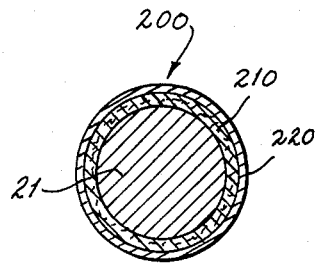
FIG. 4 is a sectional view taken along line 4—4 of FIG. 3.

It has been found that such step shear indentations can be eliminated if a shield is placed or otherwise positioned about and with its inner surface in continuous contact with the surface of the anvil 40 and/or welding 21 tip which is effectively isolated from any mechanical energy moving through the anvil 40 and/or welding tip 21. The shield serves to increase the diameter of the anvil 40 and/or welding tip 21 and, as such, to apply pressure to the workpieces W outside of the edges of the anvil 40 and/or the welding tip 21. FIG. 3 illustrates the placement of such a shield 200 which may be provided about either the anvil 40 or the welding tip 21 or both. As illustrated in FIG. 3 and FIG. 4, shield 200 includes an inner layer 210 formed from an organic material such as, for example polyethylene, polypropylene, polyvinyl chloride or other like polymeric material or other thermosetting resins such as may be used to form adhesives and, in particular, high temperature adhesives. A high temperature adhesive EPY-500 distributed by BLH Electronics, Inc. has demonstrated particularly good properties. The use of such an organic material effectively precludes radial transfer of energy from the welding tip 21 and/or the anvil 40. Outer layer 220 is formed from a metallic material such as, for example, copper, nickel, brass or the like. The modulus of the metallic material of outer layer 220 should be lower than the modulus of the material from which the anvil 40 and/or the welding tip 21 is fabricated from, i.e. carbon steel. Outer layer 220 should remain firmly attached to the anvil 40 and/or the welding tip 21 about which it is positioned.

Figure 5:
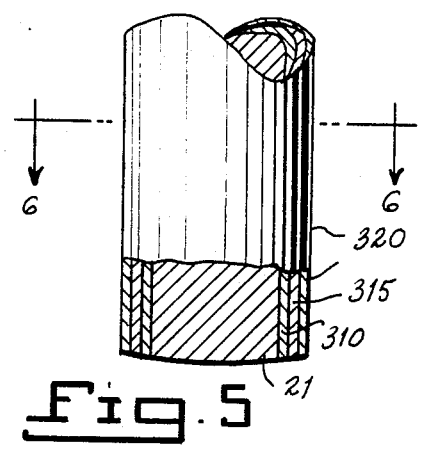
FIG. 5 is an enlarged sectional view of the anvil of such ultrasonic welding apparatus which includes an alternative shielding layer around the periphery thereof.
Figure 6:
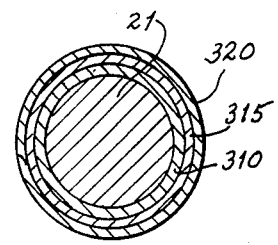
FIG. 6 is a sectional view taken along line 6—6 of FIG. 5.

Alternatively, the organic inner layer 210, shown in FIGS. 3 and 4, may be replaced with two or more metallic inner layers 310 and 315 as shown, for example, in FIGS. 5 and 6. In the embodiment of FIGS. 5 and 6 wherein a series of metallic inner layers is chosen, the particular metals and/or the interfaces between the metallic inner layers is especially important in order to minimize the transmission of the vibratory energy to the outer layer 320 which is similar in construction to outer layer 220 of FIGS. 3 and 4. Outer layer 320 is firmly attached to the anvil 40 and/or the welding tip 21 about which it is positioned.

Figure 7:
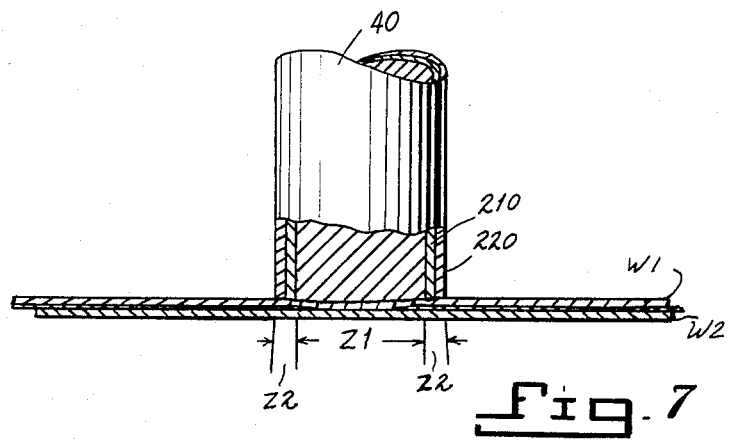
FIG. 7 is a sectional view illustrating the zones of energy in the workpieces effected by the ultrasonic vibratory apparatus and method of the subject invention.

In actual operation as shown in FIG. 7, as anvil 40 and welding tip 21 are brought together with workpieces W1 and W2 positioned in a welding position therebetween, the outer layers 220 (or 320 if the embodiment of FIGS. 5 and 6 is used) on either or both the anvil 40 and/or the welding tip 21 come in direct contact with the workpieces W thus broadening out the contact surface and thereby prevent the shear of the workpiece W1 against the anvil 40. The pressing action of the outer layer 220 (or 320) of the shield 200 (or 300) is responsible for prevention of the shear of the workpiece W which it contacts. As shown in FIG. 7, two zones are thus created in the workpieces, Z1 in which there is both vibratory energy and presssure and zone Z2 in which there is only pressure but not vibratory power.

A trial of the invention was made using a hardened copper sleeve of 0.040" wall thickness bonded to a 0.5" diametered anvil 40 with a high temperature adhesive, EPY-500, to form a cured wall of resin approximately 0.005" thick between the sleeve and the anvil. The sleeve length was held to 0.75" length to minimize the effect on vibration characteristics of the anvil. When welding 0.025" thick 2024-T3 sheets together through a 0.005" thick film adhesive (FM-123-2), the above arrangement avoided the heretofore experienced step-edge problem. Without a shield, a distinctive step-edge was produced in the described situation.

Having described the invention with specific reference to the preferred embodiments thereof, it will be appreciated that the invention may be practiced with certain modifications which do not depart from the spirit and scope thereof and, accordingly, protection should be defined by the scope of the claims appended hereto.

Wherefore, I claim:

1. Apparatus for preventing step-edge shearing during ultrasonic welding with ultrasonic vibratory spot welding apparatus of the type having a welding tip adapted to introduce high frequency lateral vibratory energy into at least two workpieces in order to effect a weld therebetween and a complimentary anvil comprising means for applying coaxial pressure against said workpieces, said pressure applying means comprising at least one shield positioned about and with the inner surface thereof in continuous contact with the surface of either or both the anvil and welding tip, said shield including both an inner and an outer layer with the inner layer comprising an organic material.

2. The apparatus for preventing step-edge shearing during ultrasonic welding of claim 1 wherein said organic material is selected from the group consisting of polyethylene, polypropylene and polyvinyl chloride.

3. The apparatus for preventing step-edge shearing during ultrasonic welding of claim 1 wherein said organic material is a high-temperature adhesive.

4. The apparatus for preventing step-edge shearing during ultrasonic welding of cliam 1 wherein the outer layer is fabricated from a metallic material, the modulus of which is lower than the modulus of steel.

5. Apparatus for preventing step-edge shearing during ultrasonic welding with ultrasonic vibratory spot welding apparatus of the type have a welding tip adapted to introduce high frequency lateral vibratory energy into at least two workpieces in order to effect a weld therebetween and a complimentary anvil comprising means for applying coaxial pressure against said workpieces, said pressure applying means comprising at least one shield positioned about and with the inner surface thereof in continuous contact with the surface of either or both the anvil and welding tip, said shield including both an inner and an outer layer with the inner layer comprising at least two layers of metallic material.

6. The apparatus for preventing step-edge shearing during ultrasonic welding claim of 5 wherein the outer layer is fabricated from a metallic material, the modulus of which is lower than the modulus of steel.

* * * * *